United States Patent
Livingston

[19]
[11] Patent Number: 6,138,398
[45] Date of Patent: Oct. 31, 2000

[54] FISHING BOBBER WITH SOUND OUTPUT

[76] Inventor: Kent A. Livingston, 264 Indian Trail, Lake in the Hills, Ill. 60102

[21] Appl. No.: 09/373,843

[22] Filed: Aug. 13, 1999

Related U.S. Application Data

[60] Provisional application No. 60/105,220, Oct. 22, 1998.

[51] Int. Cl.$^7$ .................................................. A01K 93/02
[52] U.S. Cl. ................................................. 43/17; 43/17.5
[58] Field of Search ............................... 43/17, 17.5, 17.6

[56] References Cited

U.S. PATENT DOCUMENTS

| | | |
|---|---|---|
| 2,421,068 | 5/1947 | Jamerson . |
| 3,382,598 | 5/1968 | Wilson . |
| 3,421,246 | 1/1969 | Jinushi . |
| 4,437,255 | 3/1984 | Reed ............................................. 43/17 |
| 4,748,760 | 6/1988 | Widmar et al. . |
| 4,827,655 | 5/1989 | Reed ........................................ 43/17.5 |
| 5,052,145 | 10/1991 | Wang ........................................ 43/17.5 |
| 5,157,857 | 10/1992 | Livingston . |
| 5,351,431 | 10/1994 | Ryu ............................................. 43/17 |

*Primary Examiner*—Jack W Lavinder
*Attorney, Agent, or Firm*—Leo J. Aubel

[57] ABSTRACT

The application discloses a fishing bobber comprising a floatable housing that contains a sound transducer. An elongated finger extends upwardly from the bobber housing. A balloon is place over the finger to provide a sound passage. Electronic circuitry mounted in the housing includes means for triggering the sound transducer into an active state to oscillate at an audio frequency when the housing is being pulled down into the water to thereby audibly alert the user that a fish has taken the bait.

12 Claims, 4 Drawing Sheets

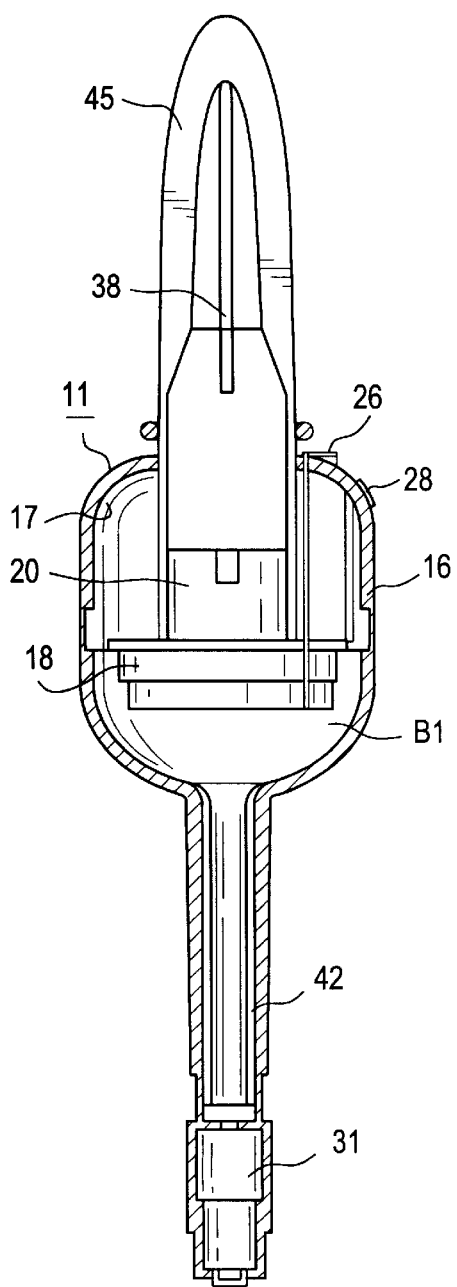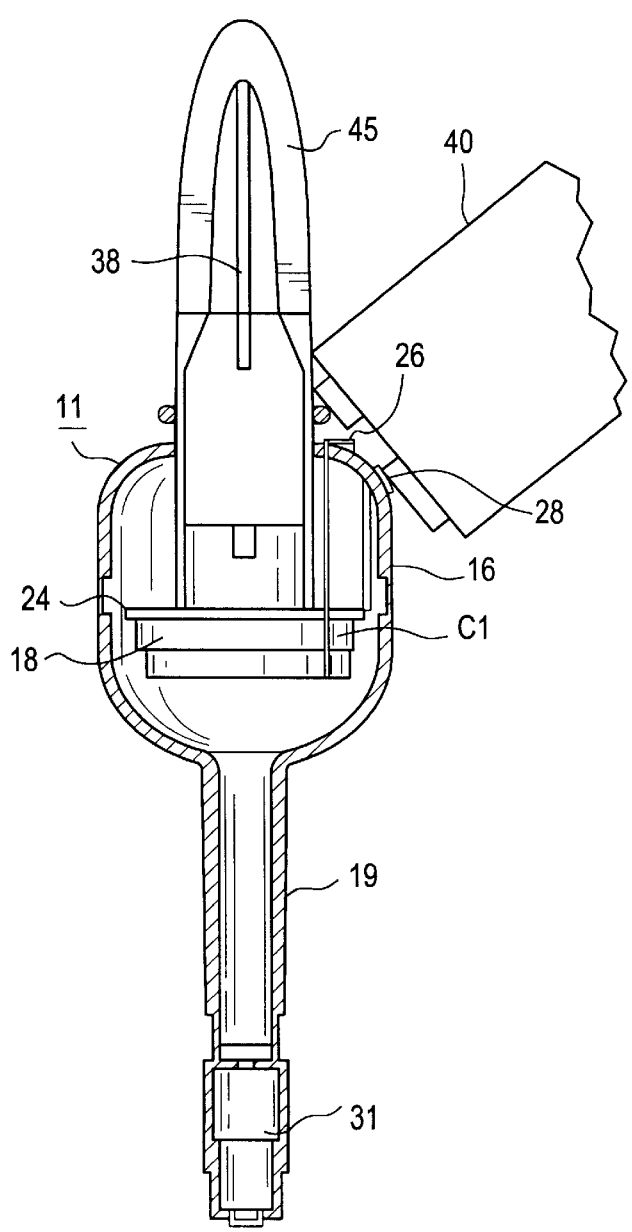

FIG. 6
FIG. 7
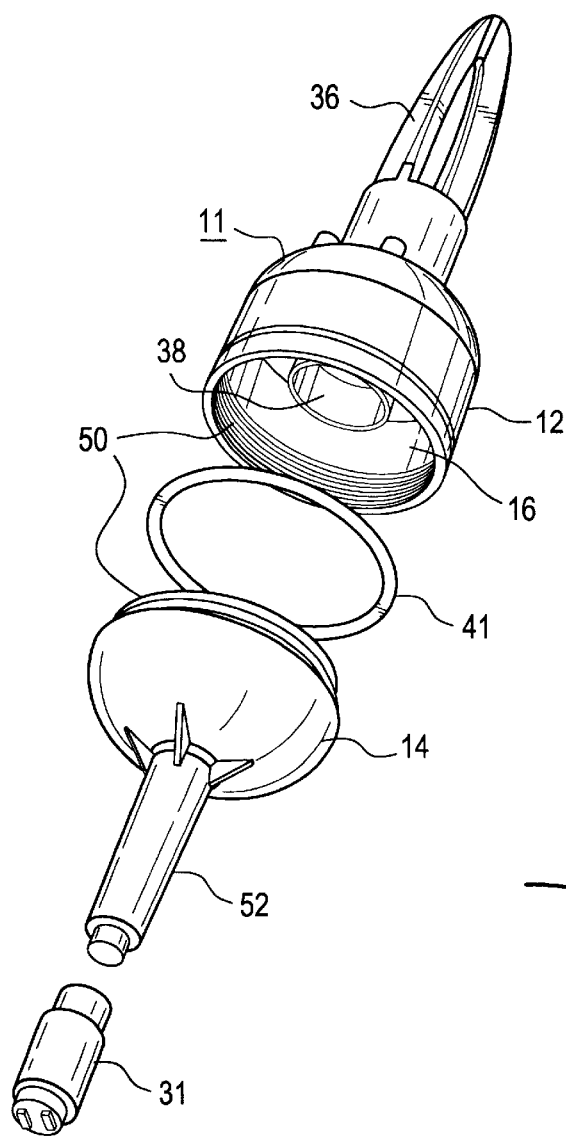
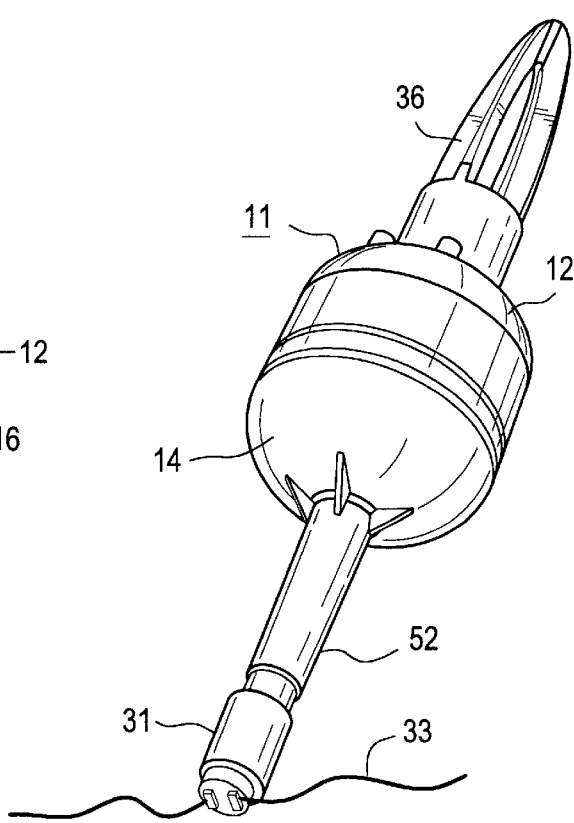

FISHING BOBBER WITH SOUND OUTPUT

This application claims the priority benefits of Provisional Application Ser. No. 60/105,220 filed Oct. 22, 1998, and is improvement over U.S. Pat. No. 5,157,857 titled "Fishing Apparatus Including Electronic Devices", issued on Oct. 17, 1992 to Kent A. Livingston, the inventor of the present invention. U.S. Pat. No. 5,157,857 discloses improved fishing lures and bobbers having a rechargeable capacitor chargeable by an external power source, for powering the circuit. U.S. Pat. No. 5,157,857 is incorporated herein by reference. Other known closely related art comprises U.S. Pat. No. 4,748,760 issued Jun. 7, 1988 to Widmar et al which discloses a noise making fishing bobber that is triggered to emit a noise when the fish takes the bait and pulls the line which switches On a sound transducer.

BACKGROUND OF INVENTION

This invention relates to an improved fishing bobber that will provide an audible indication when a fish has engaged the hook. Typically when a fisherman (fisher person) is fishing with a simple bobber, the bobber is situated on the fishing line so as to suspend the hook and bait at a selected level between the surface of the water and the bottom of the lake or stream, desirably at the depth at which the fish are swimming. When a fish takes the bait, the fish pulls the bobber down. The fisherman thus has to watch the bobber to see when it is pulled down by the fish since the movement indicates to the fisherman that a fish has taken the bait.

As alluded to above, U.S. Pat. No. 5,157,857 and U.S. Pat. No. 4,748,760 both disclose sound bobbers. In said prior art a sound diaphragm and water seal is mounted on the side of the bobber. It has been found that the sound in such prior art construction attenuates the sound so highly that, in practical operation, these prior art sound bobbers are not effective or satisfactory, even under ideal conditions when the water is calm and there is no external noise. When there is choppy water, and/or external noise, the prior art devices are inadequate.

When fishermen use the inventive audible fishing bobber, they can attach the bobber to the line in the same position on the line as with a prior art bobber. The inventive bobber suspends the bait between the top of the water and bottom in the same manner as a simple bobber. The bobber floats on top of the water similarly to a simple bobber, but when a fish takes the bait and pulls the audible fishing bobber lower down in the water, an electrical system triggers a transducer within the bobber to emit an audible tone. The audible tone alerts the fisherman that fish has taken the bait. Accordingly, the fisherman no longer has to continually watch the bobber.

Thus invention allows the fisherman to focus his visual attention on other activities such as watching his children, chatting with his company, fishing with more than one fishing rod, and enjoying the scenery. The invention more effectively combines the sense of sound and sight in the sport of bobber; that is, it allows the fisherman to also "hear" when a fish has taken the bait.

SUMMARY OF THE INVENTION:

A sound producing bobber comprising a floatable housing and having sound transducer within the housing is disclosed. The housing includes an elongated finger extending upwardly from the bobber housing. The finger has open slots on its surface, and the finger is hollow and includes an elongated sound passage communicating with the slots. The output of a sound transducer communicates with the sound passage. A water tight flexible diaphragm such as a balloon, is placed over the finger to provide an air column and passage for the sound. The balloon provides minimal attenuation of the sound. Electronic circuitry mounted in the housing includes means for triggering the transducer into an active state to oscillate at an audio frequency when the housing is pulled down into the water. The sound transducer and the electronic circuitry may be powered either by a rechargeable capacitor, or by a battery, contained in the housing.

The foregoing features and advantages of the present invention will be apparent from the following more particular description of the invention. The accompanying drawings, listed hereinbelow, are useful in explaining the invention.

DRAWINGS

FIG. 4 is a cut-away view showing the internal structure of the bobber and showing the electronic circuitry powered by an internal battery;

FIG. 5 is a cut-away view showing the bobber with a rechargeable capacitor being charged by an external battery;

FIG. 6 is an exploded view of a preferred embodiment of the bobber housing including threaded body members; and FIG. 7 shows the assembled bobber of FIG. 6.

DESCRIPTION OF THE INVENTION

Figure 1:
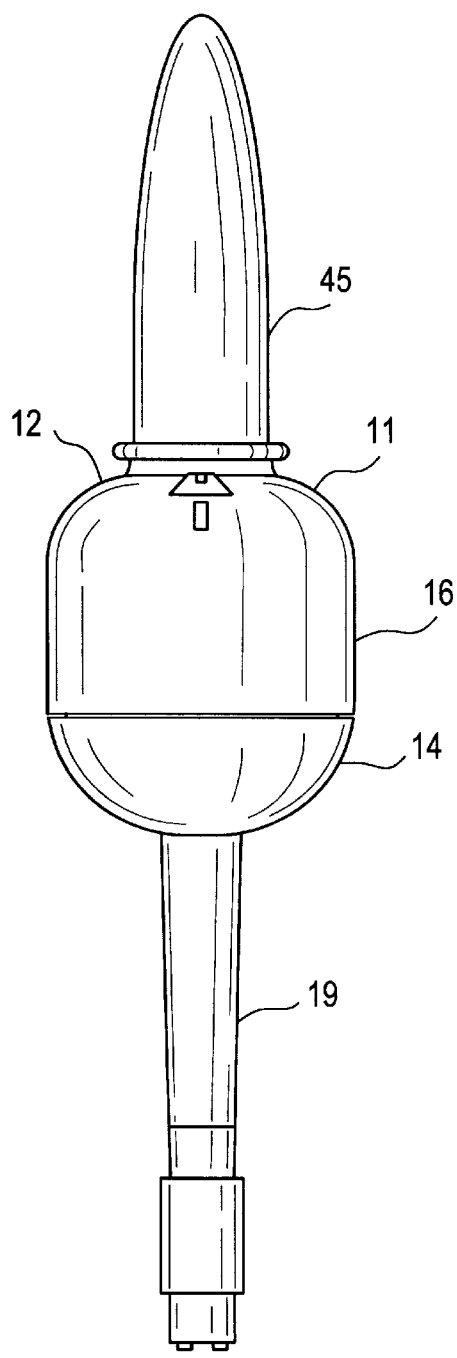
FIG. 1 is a side view of the inventive bobber.

Refer first to FIGS. 1, 2, 6 and 7 that show first embodiment of the inventive bobber 11 comprising upper and lower body members 12 and 14, made from suitable light and strong plastic, or similar material, to form a protective housing 16. Housing 16 includes a chamber 17 for an audio transducer 20 and associated electronic circuitry 18, see also FIG. 4. The housing 16 seals the sound transducer and electronic components from the water, and also provides the buoyancy for enabling the bobber 11 to float. For convenience in manufacture, members 12 and 14 are formed as separate parts, and the members 12 and 14 are then suitably joined together. The size of the housing 16 may vary dependent on the type of use, and/or the type of fish which the fisherman is fishing for.

In the embodiment of FIGS. 6 and 7, the two body members 12 and 14 are joined together by screw threads 50. A suitable flexible washer 41 maintains water tightness. Threads 50 are desired for opening the housing and replacing battery B1 when a battery is used for powering the electronic circuit, as will be described. Alternatively, as shown in the embodiments of FIGS. 1–4 the two body members 12 and 14 are mated and adhered to one another as by sonic welding or gluing.

Figure 2:
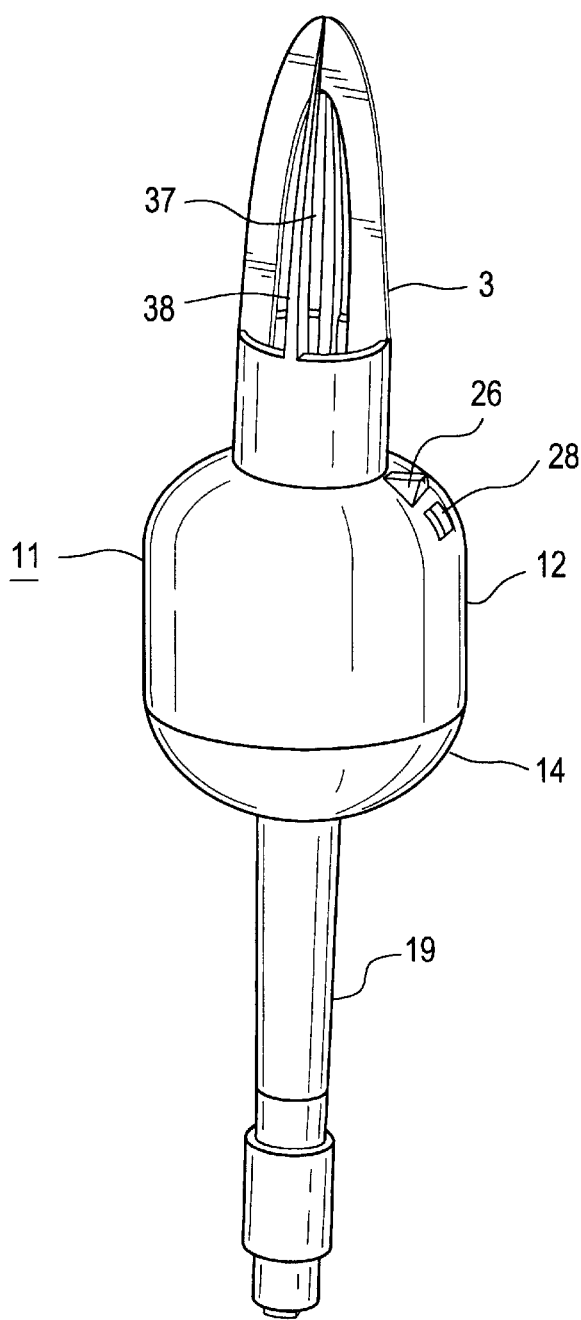
FIG. 2 is a side view of the bobber prior to placing the flexible diaphragm or balloon on the bobber.

As best seen in FIG. 2, a hollow finger or spire 36 having spaced elongated spaces or slots 37 on its periphery, extends upwardly from body member 12. The hollow finger 36 supports a balloon or flexible diaphragm 45. The hollow finger 36 in conjunction with the balloon 45 forms an air column and sound passage, as will be explained. The spaces or slots 37 enable sound to pass through with little attenuation. Circular, oval or other types of openings rather than slots 37 could likewise be used; however, the elongated slots have been found convenient to make. Finger 36 can also be of a wire-like skeletal frame or be a fluted member which provides vertical and radial support for the membrane, diaphragm or balloon 45. Also finger 36 may be of other configurations such as multi-sided, round, cylindrical or flat.

A suitable line 33 attachment 31 is affixed to the end or tip of finger 52 which extends downwardly from body member 14.

A basic concept of the finger 36 structure is that of providing an extension, and vertical and radial support for the balloon 45 so as to direct the sound output of the bobber 11 above the surface of the water. In one embodiment, finger 36 is 1.75 inches in length. Note of course that the balloon 45 fits in water tight and air tight relation around finger 36. The length of the finger 36 and of the balloon 45 provide a period of time for the bobber to emit sound when a fish is pulling the bobber down into the water. The bobber will continue to emit sound of significant volume until the highest tip of the finger 36 and balloon 45 is pulled under the water.

In use the balloon 45, or flexible sleeve-like diaphragm, which has one end closed, is placed over the upwardly extending finger 36, as shown in FIG. 1. The balloon 45 is water and air tight and maintains an air column within the finger 36. Balloon 45 is of a thin material that will permit sound from the sound transducer 20 to be conveyed or transmitted through the balloon with low attenuation. In various tests, made while fishing on a lake, the sound was clearly heard some 50 yards distant from the bobber. As will also be appreciated, balloon or diaphragm 45 also prevents water from coming into direct contact with the output seal of the sound transducer 20.

Medical type finger protectors (cots) made of rubber, have also been found effective, this in lieu of the balloon. Also the balloon or diaphragm 45 can be of plastic or other composite materials and can include ribbing or mesh molded into the material to provide support to the diaphragm.

In operation, the finger 36 carrying the balloon 45 will float or extend above the water. A colored balloon has been found to be effective to enable the fisherman to more clearly see where the bobber is floating. Balloon 45 may be changeable and replaceable, such as for changing colors and/or for changing damaged balloons. This feature is also useful such as for "drying-out" the bobber and for storage of the bobber. Balloons of different colors may be used such as for example to indicate to two or three fishermen fishing from the same boat, which bobber belongs to which fisherman.

As shown in FIGS. 2–5 an electronic circuit 18 on a conventional circuit board 24 is mounted in housing 16. In one preferred embodiment a standard battery B1 (such as used to power watches) is mounted in the housing 16 the electronic circuitry 18 and the sound transducer 20 to provide an audio output.

Two metallic terminal or nodes 26 and 28 are mounted on the external surface of housing 16 as exposed metal pads. The two terminals 26 and 28 connect to the electronic circuit, see FIG. 3. The terminals 26 and 28 have two basic functions; the first is to complete an electrical path through the water to trigger the sound transducer On, when the body of the bobber is pulled under the water.

The second function of the terminals 26 and 28 is to provide contact to an external charging battery when the rechargeable embodiment of the invention is used, as will be explained. The terminals 26 and 28 are positioned so as to make direct electrical contact with an associated battery 40 as depicted in FIG. 5. As described in above cited U.S. Pat. No. 5,157,857, of the same inventor, a double layer wet type rechargeable capacitor C1 may also be used to power the circuit. To charge the capacitor C1, the terminals of battery 40 are caused to make contact with terminal 26 and 28 for about a minute. Capacitor C1 powers the audio output transducer 20 and the electronic circuit 18, as described in above cited U.S. Pat. No. 5,157,857.

Figure 3:
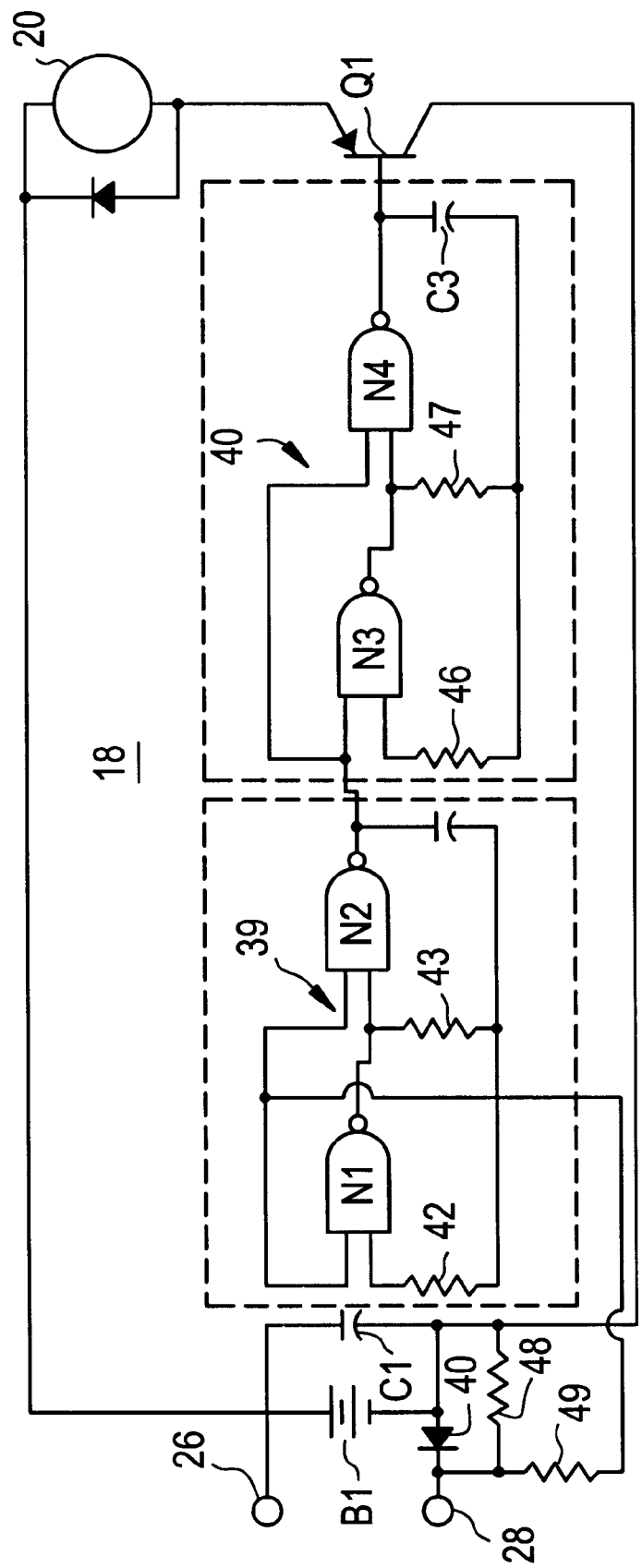
FIG. 3 shows a circuit diagram for the inventive bobber wherein the bobber includes a) a battery power source, or b) a rechargeable capacitor.

FIG. 3 depicts that in the first embodiment of the invention, a battery B1 is used to power the electronic circuit 18 and the sound transducer 20, as indicated by the solid lines in FIG. 3. In a second embodiment, the rechargeable capacitor C1 is used in lieu of the battery B1, as indicated by the dotted lines in FIG. 3. The electronic circuitry 18 and the sound transducer operate in the same manner with either method of powering. FIGS. 2 and 4 show that circuit 18 operates in an enclosed and encapsulated environment to keep water out of the electronic components and to protect the circuit 18 from physical abuse. As described above, only terminals 26 and 28 which comprise metal pads extend outwardly of the periphery of housing 16.

Capacitor C1 is a double layer 0.33 f size capacitor; the value of the capacitor may vary, so long as the capacitor has enough capacity to operate the circuit. The charge on the capacitor is generally sufficient to power the transducer and circuit for four to six strikes. The capacitor is then recharged.

The electronic circuit 18 comprises a pulsing circuit 39 that pulses at two hertz and an oscillator 40 that oscillates at an audio tone of 2,200 Hz. The voltage of battery B1 or the charge on C1 provides the voltage to the circuit. The pulsing circuit comprises Nand gates N1, N2, resistors 42, 43, and capacitor C2. Oscillator 40 comprises Nand gates N3, N4, resistors 46,47, and capacitor C3. circuit 18. Transistor Q1 functions as an amplifier. The triggering mechanism to energize the circuit 18 and turn On sound transducer 20 consists of the leads connecting to terminals 26 and 28 and resistors 48 and 49, essentially as described in cited U.S. Pat. No. 5,157,857 of the same inventor; that is, when both terminals 26 and 28 are in water they complete an electrical path to power the circuit on. Diode 40 prevents capacitor C1 itself from discharging when the terminals 26 and 28 both become wet.

The timing of the pulsing circuit 39 is determined by the RC time constant providing a frequency of, say 2 HZ, is set by resistors 42, 43 and capacitor C2. The time constant of the oscillator 40 provides an audio frequency output of say, 2.2 kHz, and is set by resistors 46, 47 and capacitor C3. The circuit is thus configured to drive the sound transducer 20 to create a pulsating output or audio tone. The input voltage gates, cause the oscillators 39 and 40 to turn On, cause amplifier Q1 to conduct to drive sound transducer 20 to provided a pulsing audio output.

In a preferred embodiment sound transducer 20 operating at about 2200 Hertz provides an 85 db output that penetrates the balloon 45 efficiently and can be heard well outdoors. As disclosed in U.S. Pat. No. 5,187,857 the circuit 18 can include an LED (light emitting diode) for visual location determination.

As described above, the two terminals 26 and 28 act as a trigger for initiating the actuation of the transducer 20, i.e., developing a sound output. In the quiescent mode, that is, with the bobber 11 floating on the water, the bobber floats such that one or both of the terminals 26 and/or 28 are out of the water. As stated above, when a fish strikes, the bobber 11 will be pulled down in the water and cause terminal 26 and 28 to close an electrical path through the water. This action will turn on transistor Q1 and trigger oscillators 39 and 40 to start oscillating. Transistor Q1 will conduct current through transducer 20 to cause the transducer to provide a loud On-Off sound. It has been found that while a continuous sound is effective, and may be used, a pulsating sound is more distinctive. While in the embodiments shown the sound transducer provides a pulsating sound other outputs such as a continuous sound, or a recorded human voice to notify the fisherman, or specific sounds such as distressed minnow splashes may be provided by the sound transducer, all as is known.

While the invention has been particularly shown and described with reference to a preferred embodiment thereof it will be understood by those skilled in the art that various changes in form and details may be made therein without departing from the spirit and scope of the invention.

What is claimed is:

1. A fishing bobber comprising:
   a) a housing floatable in water, said housing defining an interior chamber;
   b) a finger extending upwardly on housing when said housing is floating; said finger including spaces formed on its surface;
   c) a flexible water tight diaphragm positionable over said finger;
   c) a sound transducer mounted in said chamber;
   d) a power source mounted in said chamber;
   e) an electronic circuit, for controlling the activation of said transducer; said circuit activating said transducer to provide a sound output in response to said housing being pulled down in the water; and
   f) said chamber including a sound passage communicating with said finger,
   whereby sound generated by said transducer can be emitted through said sound passage, said finger and said diaphragm when said housing is being pulled down into the water.

2. A fishing bobber as in claim 1 further including
   a) electrical terminals pads mounted in spaced positions on the outer surface of said housing; said terminal pads being positioned to be above the water level when said bobber is floating in the water; said terminal pads completing an electrical path through the water for activating said electronic circuit when said bobber is pulled down and the two terminal pads are caused to be in the water.

3. A fishing bobber as in claim 2 further including a second finger extending from said housing; said second finger extending downwardly into the water when said bobber is floating, and means for attaching a fishing line to the tip or free end of said second finger.

4. A fishing bobber as in claim 1 wherein said diaphragm is a balloon.

5. A fishing bobber as in claim 4 wherein said balloon is colored for distinguishing purposes.

6. A fishing bobber as in claim 1 wherein said electronic circuit is powered by a rechargeable capacitor contained in said chamber.

7. A fishing bobber as in claim 1 wherein said electronic circuit is powered by a battery contained within said chamber.

8. A fishing bobber as in claim 1 wherein said finger comprises a pointed spire-like member.

9. A fishing bobber as in claim 1 wherein said sound transducer provides a pulsed sound output.

10. A fishing bobber as in claim 1 wherein said sound transducer provides a comprehensible audio tone.

11. A fishing bobber as in claim 1 wherein said finger extends at least 1.75 inches in height measured from said housing.

12. A fishing bobber comprising:
    a housing floatable in water and said housing defining an interior chamber;
    b) a finger extending upwardly on said floatable housing; said finger including spaces formed on its surface;
    c) a sound transducer mounted in said chamber;
    d) a power source mounted in said chamber;
    e) an electronic circuit mounted in said chamber;
    f) terminal pads on the external surface of said housing and connected to said circuit for activating said transducer in response to said housing being pulled down in the water; and
    f) said chamber including a sound passage communicating with said finger
    whereby sound generated by said transducer can be emitted through said sound passage and said finger.

* * * * *